Aug. 12, 1930.    R. ENGELS    1,773,033
AUTOMATIC BRAKE SHOE ADJUSTING APPARATUS
Filed Feb. 8, 1928
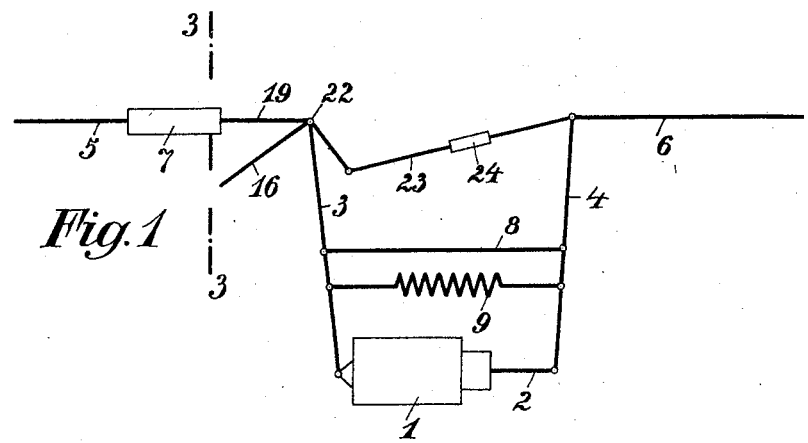
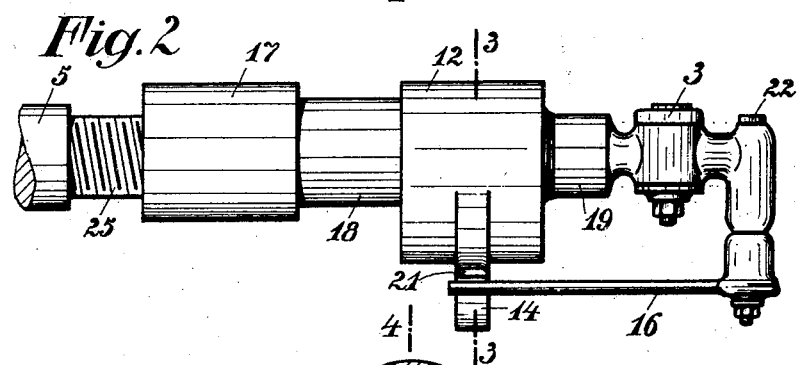
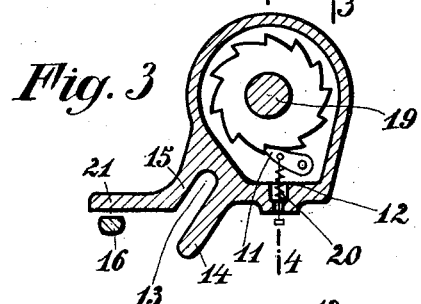
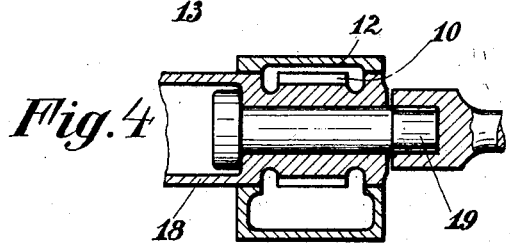
INVENTOR
Robert Engels Patented Aug. 12, 1930

1,773,033

UNITED STATES PATENT OFFICE

ROBERT ENGELS, OF VIENNA, AUSTRIA

AUTOMATIC BRAKE-SHOE-ADJUSTING APPARATUS

Application filed February 8, 1928, Serial No. 252,923, and in Austria February 28, 1927.

This invention relates to brake shoe adjustment apparatus.

As brake shoes wear, the distance between the shoes and the wheels increases, and it is known to provide mechanism in the brake link and lever gear for automatically maintaining the normal distance between the shoes and the wheels substantially constant. The adjustment may take place during the application or the release of the brake or during both of these operations. The mechanism for effecting such an adjustment comprises generally ratchet mechanism or the like wherein a driving member is moved to actuate a driven member. In some gears a lost motion is provided between these members, the sequence of the complete movement being first a forward lost motion movement executed by the driving member, then a forward movement by both the driving and driven members, then a return lost motion movement executed by the driving member only, and finally a return movement of both the driving and driven members into initial positions. This cycle of movement comprises the combined application and release movement of the brakes.

In such cases having a lost motion as mentioned above, it is usual to provide mechanism such as auxiliary arms, springs or counterweight to aid in the return movement of the driven member as the driving member engages with the driven member in one direction of movement only.

According to the present invention the link and lever gear mechanism includes an adjustment device comprising driving and driven elements so arranged that for each application and release movement of the brake and driving element first undergoes a forward lost motion movement, then a forward coupled movement with the driving member, then a return coupled movement with the driven member and finally a return lost motion movement. During the coupled movements the driving and driven members are positively coupled or locked together in such wise that both the forward and return movements of the driven member are effected solely by the driving member. The employment of return springs, counterweights, etc., is thereby avoided.

Fig. 1 shows by way of example a diagrammatic illustration of a constructional form of the link and lever gearing;

Fig. 2 is a diagrammatic side elevation of the adjusting device;

Fig. 3 is a section of the actuating mechanism of the adjusting device on the line 3—3, Figs. 1 and 2;

Fig. 4 is a section on the line 4—4, Fig. 3.

The brake cylinder 1 operated in the constructional form shown by air under pressure and its piston rod 2 are connected by levers 3 and 4 with the draw bars 5, 6 leading to the brake shoes (Fig. 1). Into one of these draw bars the adjusting device 7 is interposed which consists of a rod screw connection by the rotation of which the length of the draw bar may be varied.

The two levers 3 and 4 are connected by a link 8 and a spring 9 which returns the link and lever gearing into its initial position after the application of the brakes.

The draw bar 5 is provided at its end with a screw thread 25 and is engaged by a nut 17 which is provided with an extension 18 rotatably mounted on the intermediate member 19 pivoted to the lever 3 and carrying a ratchet wheel 10 enclosed by the casing 12 rotatably mounted on the extension. In this casing is pivoted the pawl 11 forced against the ratchet wheel by a spring 20.

The casing 12 is provided with two arms 14, 15 enclosing between them a substantially radial slot 13. One of the arms, 15, has a radial direction in its first part only. From this part extends a part 21 angularly bent relatively thereto which is in the plane of movement of the bell crank lever 16 pivoted at 22 to the intermediate member 19 (Figs. 1 and 2). The bell crank lever 16 is actuated by a link 23 pivoted to the end of the lever 4. The movement of the levers 3 and 4 by the brake cylinder 1 results in varying the distance of the ends of the levers 3 and 4 from each other and thereby causes the link 23 and the bell crank lever 16 to turn relatively to each other.

For adjusting the bell crank lever 16, a screw and rod connection 24 is provided in the link 23 which permits varying the length of the latter whereby the amount of the lost motion is varied.

When at rest the lever 16 occupies the position indicated in Figs. 1 and 3. When turned out of this position in a clockwise direction (Fig. 1) it slides first along the part 21 of the arm until it strikes against the arm 14 (Fig. 3). On further movement it moves the casing 12 and enters at the same time into the slot 13. In the return movement of the bell crank lever 16, the casing 12 is turned back again the arm still in the slot 13 engaging with the radial part of the arm 15. When the lever 16 has again left the slot 13 and the casing 12 and is again in its initial position, the lever moves along the part 21 of the arm into its own position of rest without affecting the casing.

According to the position of the pawl 11 the ratchet wheel 10 is turned either by the forward or by the backward movement of the pawl. As shown the pawl is so arranged, that it slides on the ratchet wheel when the brakes are being applied, that is to say when the casing 12 moves anticlockwise (Fig. 3) but turns the ratchet wheel when the brakes are being released, provided the forward movement was long enough to cause the pawl to engage in rear of the next ratchet tooth.

In the construction shown the lost motion or idle movement is at the beginning of the forward and at the end of the rearward movement of the lever 16. The reason of this is, that the piston rod 2 does not return into its extreme position after each application of the brakes so that the beginning of the movement varies. These variations are rendered unobjectionable by bringing the beginning of the movement within the lost motion or idle movement. If furthermore the adjustment takes place during the releasing of the brakes the forces effecting the adjustment are the greatest since besides the returning springs (for instance the spring 9) are under the heaviest tension and the brake shoes are in the most oblique position and therefore the component due to the weight of the brake shoes tending to bring about the return movement is at its maximum value. Also the elastic forces of the deformed link and lever gearing tending to bring about the return movement are at their maximum value at the beginning of the return movement.

The ratchet wheel casing 12 serving for actuating the adjusting device is in this case the carrier of the two arms 14 and 15 cooperating with the lever 16 and hence is constructed as a coupling element.

What I claim is:

1. Automatic brake shoe adjusting apparatus comprising a brake shoe adjusting device, a link and lever gearing for effecting the movement of such device, said gearing including driving and driven elements, the driving element consisting of a lever, said driven element having a slot intersecting the plane of movement of the lever constituting the driving element, a stop extending from the driven element reaching into the path of the lever, the driving element undergoing for each application and release movement of the brake first, a forward lost motion movement, then a forward coupled movement with the driven member, then a return coupled movement with the driven member and finally a return lost motion movement.

2. Automatic brake shoe adjusting apparatus comprising a brake shoe adjusting device, a link and lever gearing for effecting the movement of such device, said gearing including driving and driven elements, the driving element consisting of a lever, said driven element having a slot intersecting the plane of movement of the lever constituting the driving element, a stop extending from the driven element reaching into the path of the lever, a guide extension for the actuating lever being located on the driven element at the entrance of the slot and opposite said stop, the driving element undergoing for each application and release movement of the brake first, a forward lost motion movement, then a forward coupled movement with the driven member, then a return coupled movement with the driven member and finally a return lost motion movement.

3. Automatic brake shoe adjusting apparatus comprising a brake shoe adjusting device, a link and lever gearing for effecting the movement of such device, said gearing including driving and driven elements, the driving element consisting of a lever, said driven element having a slot intersecting the plane of movement of the lever constituting the driving element, a stop extending from the driven element reaching into the path of the lever, a link for bringing about the movement of the actuating lever, a device arranged in such link for adjusting its length, the driving element undergoing for each application and release movement of the brake first, a forward lost motion movement, then a forward coupled movement with the driven member, then a return coupled movement with the driven member and finally a return lost motion movement.

In testimony whereof I have affixed my signature.

ROBERT ENGELS.